(12) United States Patent
Park et al.

(10) Patent No.: US 9,451,542 B2
(45) Date of Patent: Sep. 20, 2016

(54) METHOD AND DEVICE FOR TRANSMITTING AND RECEIVING FRAME USING SHORT GUARD INTERVAL

(71) Applicant: LG ELECTRONICS INC., Seoul (KR)

(72) Inventors: Jong Hyun Park, Anyang-si (KR); Hyang Sun You, Anyang-si (KR); Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 114 days.

(21) Appl. No.: 14/361,179

(22) PCT Filed: Dec. 11, 2012

(86) PCT No.: PCT/KR2012/010725
§ 371 (c)(1),
(2) Date: May 28, 2014

(87) PCT Pub. No.: WO2013/089404
PCT Pub. Date: Jun. 20, 2013

(65) Prior Publication Data
US 2014/0348047 A1    Nov. 27, 2014

Related U.S. Application Data

(60) Provisional application No. 61/569,282, filed on Dec. 11, 2011.

(51) Int. Cl.
*H04W 52/02* (2009.01)
*H04W 72/04* (2009.01)
*H04W 84/12* (2009.01)

(52) U.S. Cl.
CPC ..... *H04W 52/0206* (2013.01); *H04W 52/0216* (2013.01); *H04W 72/0406* (2013.01); *H04W 72/0446* (2013.01); *H04W 84/12* (2013.01); *Y02B 60/50* (2013.01)

(58) Field of Classification Search
CPC .............. H04W 52/0206; H04W 52/0216; H04W 72/0406; H04W 72/0446; H04W 84/12; Y02B 60/50
See application file for complete search history.

(56) References Cited

U.S. PATENT DOCUMENTS

| | | | | |
|---|---|---|---|---|
| 2004/0072559 A1* | 4/2004 | Kakumaru | ........ | H04W 52/0229 455/422.1 |
| 2005/0281292 A1* | 12/2005 | Troulis | ................ | H04L 27/2657 370/516 |
| 2011/0211518 A1* | 9/2011 | Gupta | .................... | H04H 20/63 370/312 |

(Continued)

FOREIGN PATENT DOCUMENTS

| KR | 1020100071808 A | 6/2010 |
|---|---|---|
| KR | 1020110089802 A | 8/2011 |

OTHER PUBLICATIONS

3GPP TSG-Ran WG2 Meeting #72bis, R2-110384, "Open Issues on TDM solution for LTE-WiFi co-existence", Dublin, Ireland, Jan. 11, 2011.

(Continued)

*Primary Examiner* — Kwang B Yao
*Assistant Examiner* — Moo Ryong Jeong
(74) *Attorney, Agent, or Firm* — Dentons US LLP

(57) ABSTRACT

A method for receiving a beacon frame comprises the steps of: receiving a first beacon frame which contains guard interval type information; determining a second beacon frame which is to be received after the first beacon frame on the basis of the guard interval type information; and receiving the second beacon frame, wherein the guard interval type information may be information which is related to a guard interval used when the second beacon frame is transmitted.

14 Claims, 10 Drawing Sheets

(56) References Cited

U.S. PATENT DOCUMENTS

2012/0163292 A1* 6/2012 Kneckt ............ H04W 52/0229
370/328

OTHER PUBLICATIONS

3GPP TSG-Ran WG2 Meeting #76, R2-116173, "Enhanced solution for Beacon handling", San Francisco, USA, Nov. 7, 2011.

Joseph Wamicha et al., "IEEE 802.11 OFDM Software Defined Radio Beacon Frame Transmission", in IEEE Africon 2011—The Falls Resort and Conference Centre, Livingstone, Zambia, Sep. 15, 2011.

Zhibin Dou et al., "Energy-Efficient Rate Adaptation for Outdoor Long Distance WiFi Links", in IEEE INFOCOM 2011 Workshop on Green Communications and Networking, Apr. 15, 2011.

* cited by examiner

PRIOR ART

VHT Operating Mode field

Modified Operating Mode field

METHOD AND DEVICE FOR TRANSMITTING AND RECEIVING FRAME USING SHORT GUARD INTERVAL

This application is a 35 USC §371 National Stage entry of International Application No. PCT/KR2012/010725, filed on Dec. 11, 2012, and claims priority of U.S. Provisional Application No. 61/569,282 filed Dec. 11, 2011 which are each hereby incorporated by reference in its entirety.

BACKGROUND OF THE INVENTION

1. Field of the Invention

The present invention relates to wireless communication and more particularly, to a method and apparatus transmitting and receiving a frame by using a guard interval.

2. Related Art

Machine-to-Machine (M2M) systems are getting attention as the next-generation communication technology. The IEEE 802.11 WLAN working group is pursuing development of a new standard to support the M2M systems. An M2M system refers to a network enabling exchange of information among machines with no human involved. Temperature sensor, humidity sensor, camera, consumer product such as TV, manufacturing machine in a factory, and even large-sized machine such as an automobiles can be counted as one element of the M2M system. With the advent of communication services such as smart grid, e-Health, and ubiquitous communication, M2M technology is becoming more accepted to support such services. A few important features of the M2M system can be summarized as follows.

1) Large number of stations: different from existing networks, the M2M technology assumes a large number of stations. This is so because the M2M technology inherently takes into account all of the possible sensors installed at home and office as well as the machines owned by individuals. Therefore, a considerable number of stations can be connected to a single Access Point (AP).

2) Low traffic load per station: since an M2M device has a traffic pattern of gathering and reporting information of the surroundings, frequent transmission of information is not necessary and the amount of information transmitted is relatively small.

3) Uplink-oriented: in most cases, M2M devices are so structured that they receive a command via downlink transmission, carry out the corresponding actions, and report the resulting data via uplink transmission. Since most of data are delivered through uplink transmission, uplink transmission becomes a primary means for M2M communication.

4) Station's long life expectancy: M2M devices are usually battery-powered and therefore, it is not easy for a user to charge them frequently. In this regard, any M2M device is required to guarantee a long life expectancy by minimizing battery consumption.

5) Automatic recovery function: since direct operation of M2M devices may not be accessible for humans in some cases, automatic recovery is necessary.

SUMMARY OF THE INVENTION

An object of the present invention is to provide a method for transmitting and receiving a frame by using a short guard interval.

Another object of the present invention is to provide an apparatus for transmitting and receiving a frame by using a short guard interval.

To achieve the object of the present invention described above, a method for receiving a beacon frame according to one aspect of the present invention comprises receiving a first beacon frame including guard interval type information, determining a second beacon frame to be received after the first beacon frame based on the guard interval type information, and receiving the second beacon frame, where the guard interval type information is the information related to a guard interval used to transmit the second beacon frame. The guard interval type information can correspond to one of information indicating that all of the beacon frames transmitted are a Long Guard Interval (LGI) beacon frame which employs a long guard interval and information indicating that all of the beacon frames transmitted are a Short Guard Interval (SGI) beacon frame which employs a short guard interval. The guard interval type information is used to indicate that an LGI beacon interval utilizing a long guard interval is transmitted during a first transmission period while an SGI beacon frame utilizing a short guard interval is transmitted during a second transmission period. The determining a second beacon frame to be received after the first beacon frame based on the guard interval type information comprises determining a transmission period of an SGI beacon frame utilizing a short guard interval based on the guard interval type information and receiving the SGI beacon frame transmitted at the SGI beacon frame transmission period. The determining a second beacon frame to be received after the first beacon frame based on the guard interval type information comprises determining a transmission period of an LGI beacon frame utilizing a long guard interval based on the guard interval type information and receiving the LGI beacon frame transmitted at the LGI beacon frame transmission period. The guard interval type information indicates that the LGI beacon frame and the SGI beacon frame are transmitted consecutively in one period. The determining a second beacon frame to be received after the first beacon frame based on the guard interval type information comprises determining a transmission period of an SGI beacon frame utilizing a short guard interval based on the guard interval type information and receiving the SGI beacon frame transmitted at the SGI beacon frame transmission period. The determining a second beacon frame to be received after the first beacon frame based on the guard interval type information comprises determining a transmission period of an LGI beacon frame utilizing a short guard interval based on the guard interval type information and receiving the LGI beacon frame transmitted at the LGI beacon frame transmission period.

To achieve another object of the present invention described above, a station receiving a beacon frame according to one aspect of the present invention comprises a processor configured to determine, based on a guard interval type information included in a first beacon frame received, a second beacon frame to be received after the first beacon frame and a transceiver receiving the second beacon frame, where the guard interval type information is related to a guard interval used to transmit the second beacon frame. The guard interval type information can correspond to one of information indicating that all of the beacon frames transmitted are a Long Guard Interval (LGI) beacon frame which employs a long guard interval and information indicating that all of the beacon frames transmitted are a Short Guard Interval (SGI) beacon frame which employs a short guard interval. The guard interval type information is used to indicate that an LGI beacon interval utilizing a long guard interval is transmitted during a first transmission period while an SGI beacon frame utilizing a short guard interval is transmitted during a second transmission period. The processor, to determine a second beacon frame to be received after the first beacon frame based on the guard interval type information, can be configured to determine a transmission period of an SGI beacon frame utilizing a short guard interval based on the guard interval type information and receive the SGI beacon frame transmitted at the SGI beacon frame transmission period. The processor, to determine a second beacon frame to be received after the first beacon frame based on the guard interval type information, can be configured to determine a transmission period of an LGI beacon frame utilizing a long guard interval based on the guard interval type information and receive the LGI beacon frame transmitted at the LGI beacon frame transmission period. The guard interval type information indicates that the LGI beacon frame and the SGI beacon frame are transmitted consecutively in one period. The processor, to determine a second beacon frame to be received after the first beacon frame based on the guard interval type information, can be configured to determine a transmission period of an SGI beacon frame utilizing a short guard interval based on the guard interval type information and receive the SGI beacon frame transmitted at the SGI beacon frame transmission period. The processor, to determine a second beacon frame to be received after the first beacon frame based on the guard interval type information, can be configured to determine a transmission period of an LGI beacon frame utilizing a short guard interval based on the guard interval type information and receiving the LGI beacon frame transmitted at the LGI beacon frame transmission period.

According to a method and an apparatus for transmitting and receiving a frame utilizing a short guard interval according to an embodiment of the present invention described above, by transmitting a frame by incorporating information related to guard interval type into the frame, a station which receives guard interval type information can determine which guard interval is employed for the frame. Therefore, the station can obtain a power-saving effect.

DESCRIPTION OF EXEMPLARY EMBODIMENTS

Figure 1:
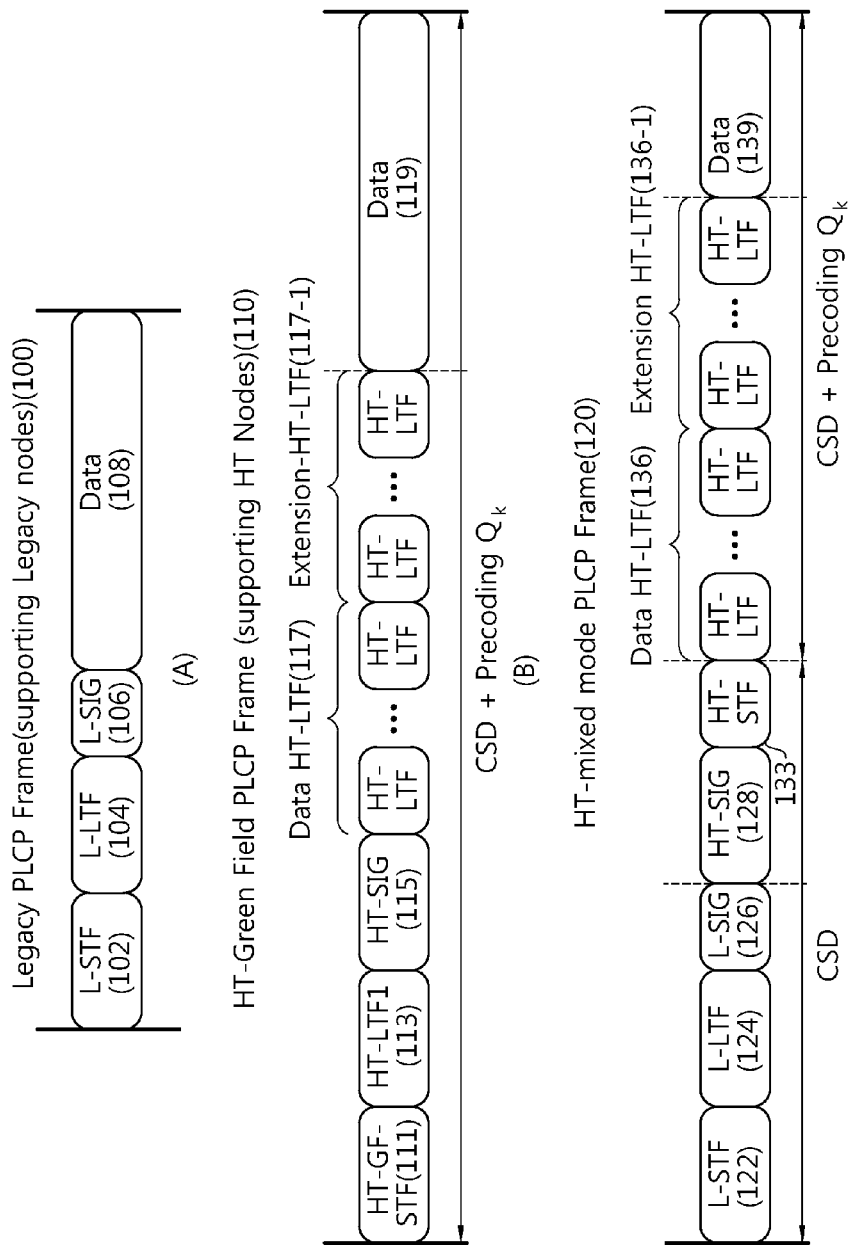
FIG. 1 illustrates a frame format of a physical layer convergence procedure protocol data unit (PPDU) defined in the existing IEEE 802.11 standard.

FIG. 1 illustrates a frame format of a physical layer convergence procedure protocol data unit (PPDU) defined in the existing IEEE 802.11 standard.

FIG. 1(A) shows a legacy PCLP frame employed for the IEEE 802.11a, IEEE 802.11b, and IEEE 802.11g.

With reference to FIG. 1(A), the legacy PLCP frame 100 comprises a Legacy Short Training Field (L-STF) 102, a Legacy Long Training Field (L-LTF) 104, a Legacy Signal (L-SIG) 106, and Data 108.

The L-STF 102 is used for frame timing acquisition and automatic gain control convergence, and the L-LTF 104 is used to perform channel estimation meant for demodulation of the L-SIG 106 and the Data 108. The L-SIG 106 includes information meant for demodulating and decoding the Data 108 transmitted subsequent thereto.

The IEEE 802.11n High Throughput (HT) system (hereinafter, it is called an HT system), which is a more recent technology standard under development, has been designed also to support the legacy PCLP formats used in the IEEE 802.11a, 802.11b, and 802.11g. The IEEE 802.11n standard defines a frame format intended for systems consisting only of HT stations (STAs) and a frame format intended for a case where there exist legacy STAs compliant with the existing IEEE 802.11a, 802.11b, and 802.11g and HT STAs newly defined by the IEEE 802.11n at the same time.

FIG. 1(B) illustrates an HT-Green Field PLCP frame 110.

With reference to FIG. 1(B), the IEEE 802.11n defines a system consisting of HT STAs only and newly defines a PLCP frame format which can be used efficiently in the system. The PLCP frame format is called an HT-Green Field PLCP format 110.

The HT-Green Field PLCP format 110 comprises an HT-Green Field Short Training Field (HT-GF STF) 111, an HT Long Training Field (HT-LTF) 113, an HT Signal (HT-SIG) 115, an additional HT-LTF 117, 117-1, and Data 119. The HT-GF-STF 111 is used for frame timing acquisition and automatic gain control convergence. The HT-LTF 113 is used to perform channel estimation meant for demodulation of the HT-SIG 115 and the Data 119. The HT-SIG 115 includes information meant for demodulating and decoding the Data transmitted subsequent thereto. The additional HT-LTF 117, 117-1 can be included additionally to the frame format when the Multiple Input Multiple Output (MIMO) scheme is employed. In case the additional HT-LTF 117, 117-1 is transmitted based on the MIMO scheme with respect to a plurality of STAs, the additional HT-LTF 117, 117-1 can include channel estimation information for each of the STAs.

FIG. 1(C) illustrates an HT-mixed Mode PLCP Frame 120.

With reference to FIG. 1(C), the IEEE 802.11n supports a PLCP frame designed to support the HT mode in a system where there exist legacy STAs and HT STAs. The aforementioned frame format is called an HT-mixed mode PLCP frame 120. To support legacy STAs to understand the HT-mixed mode PLCP frame, the L-STF 122, the L-LTF 124, and the L-SIG 126 are transmitted first. Next the HT-SIG 128, which carries information required for demodulating and decoding the Data, is transmitted. Fields up to the HT-SIG 128 are transmitted without employing a beamforming mechanism so that various STAs including legacy STAs can receive information. The HT-LTF 136 and the Data 139 are transmitted through precoding. At this time, the HT-STF 133 is transmitted so that an STA, which receives a data frame through precoding, can accommodate the part for which power is varied according to the precoding, and then the HT-LTFs 136 and the Data 139 are transmitted.

Figure 2:
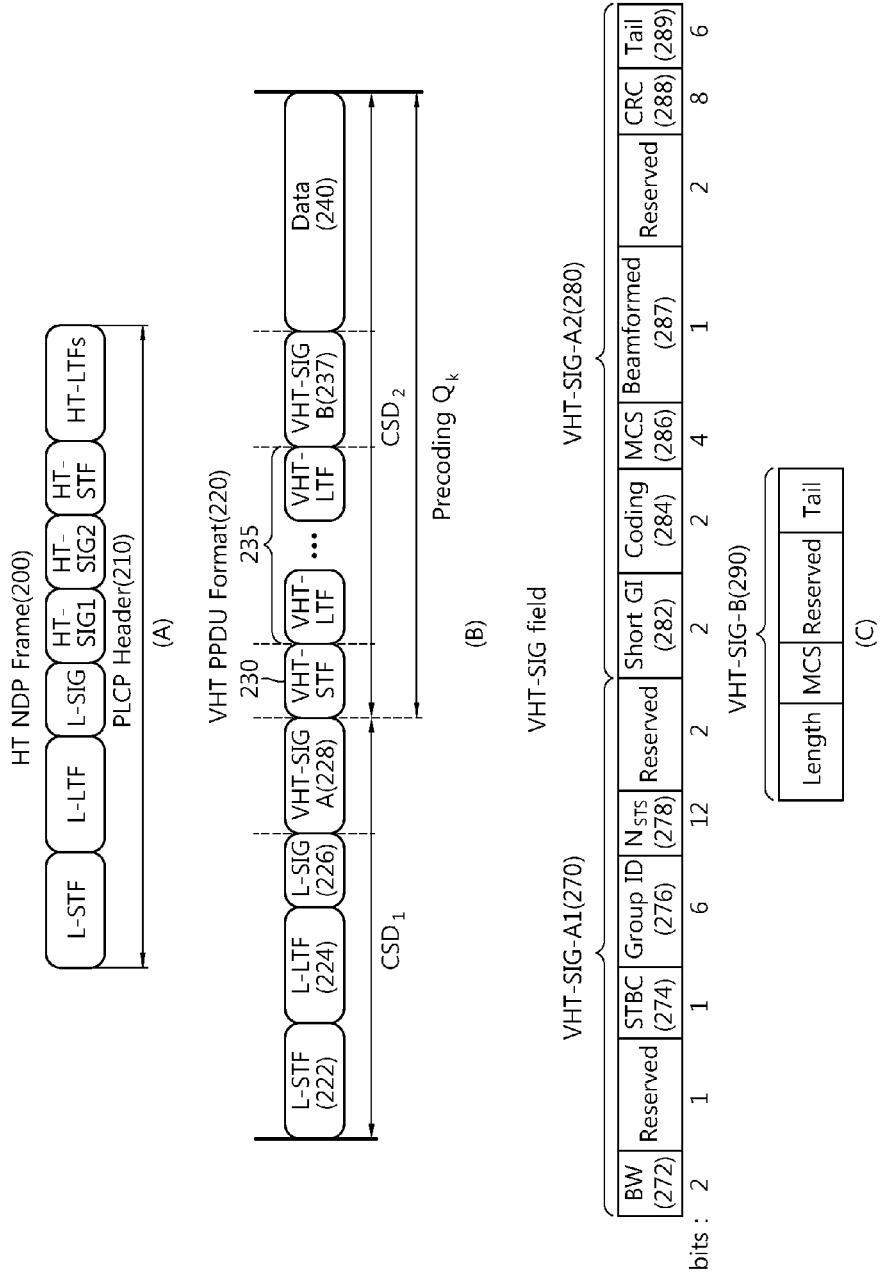
FIG. 2 illustrates a frame format of a physical layer convergence procedure protocol data unit (PPDU) defined in the existing IEEE 802.11 standard.

FIG. 2 illustrates a frame format of a physical layer convergence procedure protocol data unit (PPDU) defined in the existing IEEE 802.11 standard.

FIG. 2(A) shows an HT NDP frame 200.

With reference to FIG. 2(A), one of important characteristics of an HT system is that multiple spatial streams can be transmitted through multiple antennas to improve throughput of the HT system. Data transmission to a particular STA in the presence of multiple STAs requires beamforming and thus a channel sounding technique is required. The IEEE 802.11n supports two channel sounding methods. One of the two methods makes use of a regular PPDU including a data field and a MAC header, and the other one employs a Null Data Packet (NDP) which does not include the data field. In case channel sounding based on the NDP is applied, a PPDU frame in which an NDP Announcement is included to announce the NDP needs to be transmitted first.

An NDP frame refers to the frame without the Data field and includes only the PLCP header 210 which forms the structure of the frame.

FIG. 2(B) shows a VHT PPDU format 220.

With reference to FIG. 2(B), the IEEE 802.11ac newly defines the VHT PPDU frame 220. The IEEE 802.11ac standard relates to the Wireless Local Area Network (WLAN) supporting Very High Throughput (VHT) in the frequency domain below 6 GHz. The IEEE 802.11ac supports WLAN throughput of 1 Gbps for multi-STAs and for the case of one STA, supports maximum throughput of at least 500 Mbps.

Also, the IEEE 802.11ac supports channel bandwidth of 80 MHz and 160 MHz compared with the IEEE 802.11n which supports channel bandwidth of a maximum of 40 MHz and supports non-contiguous channel bandwidth of 80+80 MHz. Compared with the IEEE 802.11n capable of supporting throughput of a maximum of 450 Mbps and supporting a maximum of 64 Quadrature Amplitude Modulation (QAM) to support high throughput of 1 Gbps, the IEEE 802.11ac supports a maximum of 256-QAM. And different from the IEEE 802.11n supporting only the Single User-Multiple Input Multiple Output (SU-MIMO) scheme, the IEEE 802.11ac supports the Multiple User (MU)-MIMO scheme.

Since the IEEE 802.11ac supports the MU-MIMO scheme, STAs can have one or more antennas, and the current specification of the IEEE 802.11ac only supports downlink MU-MIMO communication through which packets are transmitted from an Access Point (AP) to multiple STAs. The maximum number of STAs allowed to transmit packets at the same time is 4, and in case the maximum number of spatial streams to be supported is 8, each STA can handle up to four streams.

The VHT physical layer supports the MU-MIMO scheme and Orthogonal Frequency Division Multiplexing (OFDM). The VHT physical layer supports contiguous channel bandwidth of 20 MHz, 40 MHz, 80 MHz, and 160 MHz and non-contiguous channel bandwidth of 80+80 MHz. Each subcarrier of the VHT physical layer supports Binary Phase Shift Keying (BPSK), Quadrature Phase Shift Keying (QPSK), 16-QAM, 64-QAM, and 256-QAM and supports 1/2, 2/3, 3/4, and 5/6 encoding rate through Forward Error Correction (FEC) based on convolutional code or Low-Density Parity-Check (LDPC) code.

In the VHT setting, a PLCP Service Data Unit (PSDU) is formed to transmit a packet and a PLCP preamble is added to the PSDU, by which a PLCP Protocol Data Unit (PPDU) is created. The PLCP preamble is used to support demodulating and transmitting the PSDU at a receiver-side.

The VHT PPDU format 220 comprises L-STF 222, L-LTF 224, L-SIG 226, VHT-SIG-A 228, VHT-STF 230, VHT-LTFs 235, VHT-SIG-B 237, and data field 240. While the L-STF 222, L-LTF 224, and L-SIG field 226 are used in the WLAN before VHT is supported, the VHT-SIG-A 228, VHT-STF 230, VHT-LTFs 235, and VHT-SIG-B field 237 are defined only in the VHT packets.

To examine the fields newly added to support VHT, the VHT-SIG-A field 228 carries information meant to explain a VHT format packet, which is commonly required for the whole STAs. The VHT-SIG-A field 228 comprises a VHT-SIG-A1 field 270 and a VHT-SIG-A2 field 280, where the VHT-SIG-A1 field 270 carries information such as bandwidth 272 of an employed channel, indication 274 as to whether Space Time Block Coding (STBC) is employed, a group ID 276 to represent a group of STAs used for transmission in the MU-MIMO scheme, and the number 278 of streams used. On the other hand, the VHT-SIG-A2 field 280 carries information such as a Short Guard Interval (SGI) 282, FEC 284, information 286 about a Modulation and Coding Scheme (MCS) for a single user or channel coding type for multi-users, information 287 about beamforming, redundancy bits 288 for Cyclic Redundancy Checking (CRC), and tail bits 289 of a convolutional decoder.

The VHT-STF 230 is defined to improve performance of automatic gain control estimation in the MIMO environment, and the VHT-LTF 235 is defined to estimate a channel in the same environment. The VHT-SIG-B 237, defined for each STA, carries length of the PSDU, information about the MCS, and tail bits.

FIG. 2(C) shows VHT-SIG-A field 270, 280 consisting of two symbols and VHT-SIG-B field 290 consisting of one symbol. Of the two fields, specific contents of the VHT-SIG-A1 field 270 are described in Table 22-11 fields in the VHT-SIG-A field of Section 22.3.8.2.3 of the Draft STANDARD for Information Technology—Telecommunications and information exchange between systems—Local and metropolitan area networks—Specific requirements Part 11: Wireless LAN Medium Access Control (MAC) and Physical Layer (PHY) specifications Amendment 4: Enhancements for Very High Throughput for Operation in Bands below 6 GHz. Details of the contents of the VHT-SIG-B field 290 are described in Table 22-13.

In what follows, embodiments of the present invention disclose physical (PHY) preamble structure (for which a PLCP header can be used in the same meaning) meant for devices operating in the frequency band below 1 GHz. The present invention can be applied to those devices operating in the frequency band below 1 GHz defined in the IEEE 802.11ah standard or the IEEE 802.11af standard, such as Machine-To-Machine (M2M) systems. However, the present invention is not limited to M2M systems but can also be applied to conventional WLAN system (or Wi-Fi networks) unless such application departs from the technical principles of the present invention.

Due to the nature of a radio wave, communication below 1 GHz frequency (sub-1 GHz) can be carried out with significantly large service coverage compared with that provided by an existing WLAN system oriented to indoor environments. The frame structure of the physical layer (PHY) employed in the frequency band below 1 GHz can be implemented by 1/10 down-clocking of the frame structure used by the existing IEEE 802.11ac system. In this case, the frame used for the 20/40/80/160/80+80 MHz channel bandwidth defined for the IEEE 802.11ac systems can be used for the 2/4/8/16/8+8 MHz channel bandwidth in the sub-1 GHz through the 1/10 down-clocking. According to the 1/10 down-clocking, a guard interval (GI) is increased ten times from the original 0.8 µs to 8 µs. In case the frequency band is reduced by a factor of 10 and a 1/10 down-clocked frame is used, data processing throughput is accordingly reduced by a factor of 10.

In the embodiment of the present invention below, it is assumed for the convenience of description that a frame is generated from the IEEE 802.11ac frame through 1/10 down-clocking. The duration of one OFDM symbol in the 1/10 down-clocked frame can amount to 40 µs, which is ten times the duration of one OFDM symbol in the original frame, 4 µs.

The method for generating a PLCP preamble according to the present invention can also be applied to the PLCP preamble of the IEEE 802.11ac frame down-clocked by a factor different from the 1/10 down-clocking, and embodiments based on the frames down-clocked by the different factor also belong to the technical scope of the present invention.

Since no legacy devices operate in the frequency band of S1G (Sub-1 GHz), a PLCP preamble can be designed without consideration of backward compatibility.

The frame obtained by 1/10 down-clocking of the PLCP Protocol Data Unit (PPDU) of the HT-green field format, disclosed in the 20.3.2 PPDU format of the IEEE Standard for Information Technology Telecommunications and information exchange between systems Local and metropolitan area networks Specific requirements Part 11: Wireless LAN Medium Access Control (MAC) and Physical Layer (PHY) Specifications (hereinafter, IEEE 802.11), can be employed so that existing frames can also be used in the S1G frequency band.

In what follows, for the convenience of description, embodiments of the present invention assume that the HT-green field format is down-clocked. However, the present invention can also be applied to the frame format described in FIGS. 1 and 2, and the embodiments based on such application also belong to the technical scope of the present invention.

Figure 3:
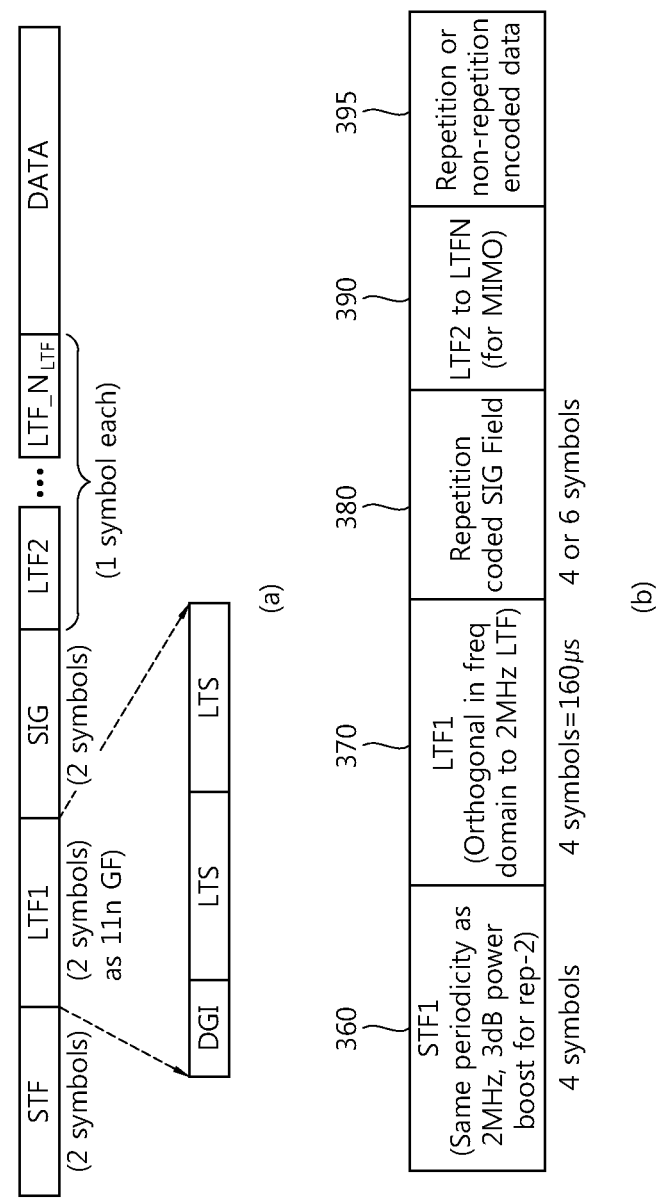
FIG. 3 illustrates a frame obtained from 1/10 downclocking of a HT-green field format PPDU.

FIG. 3 illustrates a frame obtained from 1/10 down-clocking of a HT-green field format PPDU.

With reference to FIG. 3, the PPDU of the 1/10 down-clocked HT-green field format comprises a PLCP preamble 300 and a data payload (or data field 380). The PCLP preamble 300 comprises a Short Training Field (STF) 310, Long Training Field 1 (LTF1) 320, SIG 330, and LTF2 to LTF_N 340. Definition of and information included in each field are disclosed in the HT-green field format preamble of Section 20.3.9.5 of the IEEE 802.11 specifications. The following describe briefly the purpose of each field.

The STF 310 can be used to perform automatic gain control estimation, timing acquisition, and coarse carrier frequency offset estimation.

The LTF1 320 and LTF2 to LTF_N 340 can be used to perform channel estimation and precision Carrier Frequency Offset (CFO) estimation. The LTF, having two OFDM symbols, can include two Long Term Symbols (LTSs) 350, 355 and a guard interval 360.

The LTF1 320 can be used to demodulate data payload (or data field 380) of the PPDU. The LTF2 to LTF_N 340 can be used for channel estimation with respect to the respective channels transmitting a space-time stream based on the MIMO scheme. In case the LTF2 to LTF_N 340 is based on the MIMO scheme, the number of LTFs included in the PLCP preamble can be determined by the number of space-time streams.

The SIG 330 can include information to be used to interpret the HT packet format. For example, various types of information intended for interpreting the HT packet, such as the Modulation and Coding Scheme (MCS), channel bandwidth, and FEC coding scheme can be included in the SIG 330.

The STF 310 and LTF1 320 can each have the duration of two OFDM symbols. In case 1/10 down-clocking has been performed, one OFDM symbol lasts for duration of 40 µs; therefore, the STF 310 and the LTF1 320 preceding the SIG 330 have a total of 160 40 µs of symbol duration.

FIG. 3(B) shows a frame format to perform extended range communication.

FIG. 3(B) assumes that a frame of the HT-green field format is transmitted while utilizing frequency bandwidth of 1 MHz.

For example, in case a frame with 1 MHz bandwidth is transmitted, a repetitive frame structure can be adopted. In other words, at least one of the STF 360, the LTF 370, the SIF 380, and the data field 395 is transmitted being repeated along the frequency or the time axis, and thus the frame, which is transmitted when communication is carried out to accommodate large coverage, can be made to be robust to communication errors.

With reference to FIG. 3(B), the OFDM symbol allocated to the STF 360 is allocated from 2 symbols to 4 symbols. In case 40 µs is allocated to one symbols as 1/10 down-clocking is performed, 160 µs is allocated to 4 symbols.

The STF 360 can be transmitted with the same period as in the transmission with 2 MHz bandwidth, and since a repetition structure can be employed for the STF 360, transmission power can be increased as much as 3 dB.

The OFDM symbol allocated to the LTF 370 can also be increased from 2 symbols to 4 symbols. The LTF can be transmitted being orthogonal in the frequency axis with respect to the LTF transmitted with 2 MHz bandwidth.

Similarly, the symbol allocated to the SIG field 380 can be increased from 2 symbols to 4 symbols or 6 symbols with a repetition structure.

The present invention provides a method for improving medium efficiency and increasing a power saving effect of an STA by enabling an Access Point (AP) compliant with the IEEE 802.11ah to transmit beacon frames employing a Short Guard Interval (SGI).

For conventional WLAN APs, Long Guard Intervals (LGIs) are always used to transmit not only the beacon frames but also other broadcast frames. As in the IEEE 802.11ah system utilizing 1/10 down-clocking, however, application of the LGI itself may cause overhead for those environments where OFDM symbol duration is long. In particular, the same APs of the IEEE 802.11ah can be installed in an indoor environment depending on use cases. Therefore, in the case of indoor applications, target coverage may be set to cover a small indoor area, and STAs connecting to such APs as above may be located as close as tens of meters to the APs. In this manner, taking into account the fact that the 1/10 down-clocked LGI is 8 µs and the SGI is 4 µs, as the distance between an AP and STAs becomes closer, many STAs are enabled to deal with a maximum channel delay by using the SGI only.

In other words, depending on use cases and target applications, in case transmission is performed selectively based on a beacon frame which uses the SGI as a guard interval or a beacon frame which uses the LGI as the guard interval for each AP compliant with the IEEE 802.11ah specifications, medium efficiency and a power saving effect of non-AP STAs can be greatly improved.

In the embodiment of the present invention below, short guard interval beaconing or SGI beaconing refers to the case where a beacon frame employing the SGI as a guard interval is transmitted, while long guard interval beaconing or LGI beaconing refers to the case where a beacon frame employing the LGI as a guard interval is transmitted.

Since the WLAN standard such as the IEEE 802.11ac defines reception capability of a frame to which the SGI has been applied as an optional feature, a significant number of devices are left incapable of decoding frames to which the SGI has been applied.

The present invention discloses a method for the IEEE 802.11ah system to receive a frame to which the SGI has been applied in the frequency band of 1 MHz and 2 MHz. Suppose reception capability of a frame transmitted in the frequency band of 1 MHz and 2 MHz to which the SGI has been applied is mandated. Then even if a particular AP transmits a frame by using the SGI, all of the IEEE 802.11ah devices can perceive the transmission. The frequency band of 1 MHz and 2 MHz is one example, and a frame to which the SGI has been applied can also be received in a different frequency band.

For example, the IEEE 802.11ah devices, by performing scanning of APs, can connect selectively to an AP which performs SGI beaconing or LGI beaconing.

For example, if channel delay is not that big for STAs and an AP located in an indoor environment, the case where STAs are connected to an AP of a Basic Service Set (BSS) for which the SGI beaconing is broadcast periodically provides a larger power saving effect than the case where the STAs are connected to an AP employing the LGI beaconing, and medium efficiency of the BSS can be increased, too.

As another embodiment of the present invention, disclosed is a method for obtaining a power saving effect and BSS medium efficiency improvement effect even for the case where reception of the SGI in the frequency band of 1 MHz and 2 MHz is not defined as mandatory by the IEEE 802.11ah standard.

Figure 4:
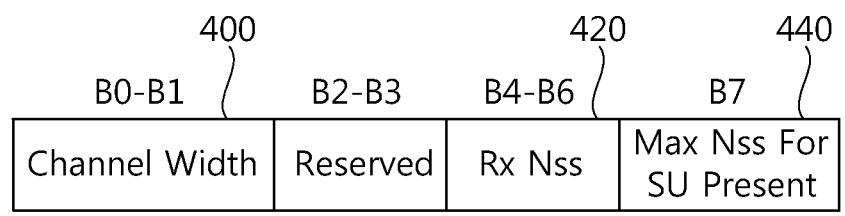
FIG. 4 illustrates a VHT operating mode field in the IEEE 802.11ac system.

FIG. 4 illustrates a VHT operating mode field in the IEEE 802.11ac system.

With reference to FIG. 4, the VHT operating mode field is a field included in a VHT operating mode notification frame.

The VHT operating mode notification frame action field format is disclosed in Section 8.5.16.4 of the IEEE P802.11ac™/D1.0 (Draft STANDARD for Information Technology—Telecommunications and information exchange between systems—Local and metropolitan area networks—Specific requirements Part 11: Wireless LAN Medium Access Control (MAC) and Physical Layer (PHY) specifications Amendment 5: Enhancements for Very High Throughput for Operation in Bands below 6 GHz), disclosed at May 2011.

The VHT operating mode field can include information about bandwidth of an operating channel which can be used for an STA to receive data and the number of spatial streams.

The VHT operating mode field can have subfields comprising channel width 400, the number of Rx spatial streams (Rx Nss) 420, and the maximum number of spatial streams (Max Nss for SU present) 440.

Table 1 shows subfield information included in the VHT operating mode field.

TABLE 1

| subfield | description |
| --- | --- |
| channel width | If Max Nss For SU Present is set to 0, indicates the supported channel width: Set to 0 for 20 MHz Set to 1 for 40 MHz Set to 2 for 80 MHz Set to 3 for 160 MHz or 80 + 80 MHz Reserved if Max Nss For SU Present is set to 1. |
| Rx Nss | The maximum number of spatial streams the STA can receive interpreted according to the Max Nss For SU Present setting: Set to 0 for Nss = 1 Set to 1 for Nss = 2 . . . Set to 7 for Nss = 8 |
| Max Nss for SU Present | Set 0 if Rx Nss indicates the supported number of spatial stream. Set 0 if Rx Nss indicates the supported number of spatial stream. the beamformee can receive in a single user beamformed transmission when feedback type = 1(as defined in Table 8-ac4(Subfields of the VHT MIMO Control field)) was used to calculate the beamforming steering matrix |

With reference to Table 1, the information included in each subfield has the following meaning.

(1) The channel width 400 transmits information about supported channel width in case the maximum number of spatial streams 440 is set to 0. The channel width can be set to 0 in the case of 20 MHz; 1 in the case of 40 MHz; 2 in the case of 80 MHz; and 3 in the case of 160 MHz or 80+80 MHz.

The number of Rx spatial streams (Rx Nss) 420 can include information about the maximum number of spatial streams 440 that the STA can receive according to configuration of the maximum spatial streams 440. In case Nss is 0, the number of spatial streams that can be received can be 1; in case Nss is 1, it can be 2; in case Nss is 2, it can be 3; in case Nss is 3, it can be 4; and in case Nss is 8, it can be 7.

If the maximum number of spatial streams (Max Nss for SU present) 440 is 0, the number of Rx spatial streams (Rx Nss) 420 indicates the number of supported spatial streams, while if the maximum number of spatial streams (Max Nss for SU present) 440 is 1, the number of Rx spatial streams (Rx Nss) 420 indicates the maximum number of spatial streams.

In other words, in the IEEE 802.11ac system, operating mode of a current BSS can be known through the VHT operating mode field.

In addition to transmitting a field including information on an operating mode as described above, the IEEE 802.11ah system according to the present invention provides a method for transmitting information on beacon transmission capability or beacon Guard Interval (GI) type of an AP by incorporating the information into the operating field included in the beacon frame or the probe response frame.

According to an embodiment of the present invention, information about an operating mode (driving mode) can be transmitted being included in a management frame rather than the beacon frame or the probe response frame. Moreover, the information on an operating mode can be transmitted being included in the form of an information element rather than a field.

In other words, in the IEEE 802.11ah system, various types of management frames can be used to transmit information such as the beacon transmission capability or the beacon GI type, and the information can be transmitted being included in various types of formats (for example, field, subfield, information element, and so on).

Figure 5:
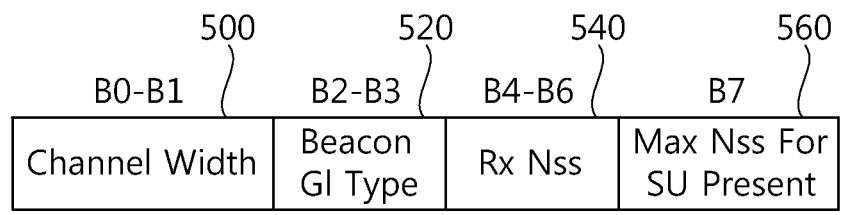
FIG. 5 illustrates a driving mode field according to an embodiment of the present invention.

FIG. 5 illustrates a driving mode field according to an embodiment of the present invention.

FIG. 5 shows one example of a field format when a method for transmitting information such as the beacon transmission capability or beacon GI type by incorporating the corresponding information additionally into an existing VHT driving mode field is used.

As described above, the beacon transmission capability or the beacon GI type can be transmitted being included in a different field or in a different information element. Also, the beacon transmission capability or the beacon GI type can be transmitted in the form of an independent frame. An embodiment implementing the above scheme also falls into the technical scope of the present invention.

For the convenience of description, FIG. 5 assumes that a beacon guard interval type subfield is transmitted being included in the beacon frame.

Information contained in the channel width 500, the maximum number of Rx spatial streams (Rx Nss) 540, and the maximum number of spatial streams (Max Nss For SU present) 560 are the same as described above.

By receiving information on the beacon guard interval type 520, information on a guard interval used for a current AP to transmit the beacon frame can be known.

The beacon guard interval type 520 can include information according to the subfield values as shown in Table 2.

TABLE 2

| Subfield | Description |
| --- | --- |
| Beacon GI Type | Set to 0 if Long GI is used for every beacon frame.<br>Set to 1 if Short GI is used for every beacon frame.<br>Set to 2 if Long GI is used every odd beacon interval, and Short GI is used every even beacon interval.<br>Set to 3 if Short GI is used for every beacon frame, and every beacon transmission with Short GI is immediately followed by additional beacon transmission with Long GI. |

With reference to Table 2, in case (1) the beacon GI type field 520 is 0, the same operation is carried out on the existing VHT Operating Mode field of the current IEEE 802.11ac/D1.0. The STAs within a BSS which have received a beacon frame where the beacon GI type field 520 is 0 can know that the beacon frame transmitted subsequently corresponds to long guard interval beaconing which employs the LGI.

(2) In case the beacon GI type field 520 is 1, a subsequent beacon frame always performs short guard interval beaconing which employs the SGI.

For example, a particular STA which has received a beacon frame whose beacon GI type field is 1, if it determines that reliable reception can be achieved when LGI beaconing is employed, can perform scanning of other APs to establish a connection rather than connect to an AP which carries out SGI beaconing.

(3) In case the beacon GI type field is 2, it indicates employing a beaconing transmission method where a subsequent beacon frame alternates broadcasting an LGI beacon frame and an SGI beacon frame at regular beacon intervals. In other words, beacon frames are broadcast for each beacon interval while the LGI beaconing and the SGI beaconing are performed one after the other repeatedly.

An SGI indication bit in the SIG field of each beacon frame can indicate dynamically as to whether a current beacon frame employs the SGI or the LGI. Various other methods can also be used to indicate as to whether the current frame is a beacon frame to which the SGI or the LGI has been applied.

(4) In case the beacon GI type field is 3, a subsequent beacon frame which uses the SGI as a Cyclic Prefix (CP) for each beacon interval is always broadcast first. Right after the SGI beaconing is carried out, the LGI beaconing is carried out to broadcast a beacon frame.

In case the aforementioned method is used, different from the case where the beacon GI type field is 2, the SGI beaconing and the LGI beaconing can be carried out for each beacon frame interval. An STA can selectively receive a beacon frame transmitted based on the LGI or on the SGI. A power saving effect can be achieved as the STA selectively receives a beacon frame which uses a guard interval requested by the STA.

In case the beacon GI type field is 3, the scope of the present invention includes the case where a beacon frame is transmitted at the same guard interval based on two types of guard intervals independently of which beacon frame between the short guard interval beacon frame and the long guard interval beacon frame is transmitted first at each beacon interval. At this time, a time interval between the LGI beacon frame and the SGI beacon frame can be predetermined as a Short Interframe Space (SIFS) interval or a Point Interframe Space (PIFS) interval.

In addition to the beacon GI type field described in Table 2, various methods for transmitting the SGI beacon frame and the LGI beacon frame can be used. As another example, various methods can be used, such as the one for transmitting the SGI and the LGI beacon frame according to a predetermined particular period.

In other words, the beacon GI type value described in Table 2 and the guard interval transmission type mapped to the value are used as an example to represent the transmission type of the guard interval, where a different value from the above can be used, and the corresponding embodiment is included in the technical scope of the present invention.

Also, the guard interval type field meant to indicate the guard interval type can be transmitted being included in a different management frame such as a probe response frame rather than a beacon frame.

Figure 6:
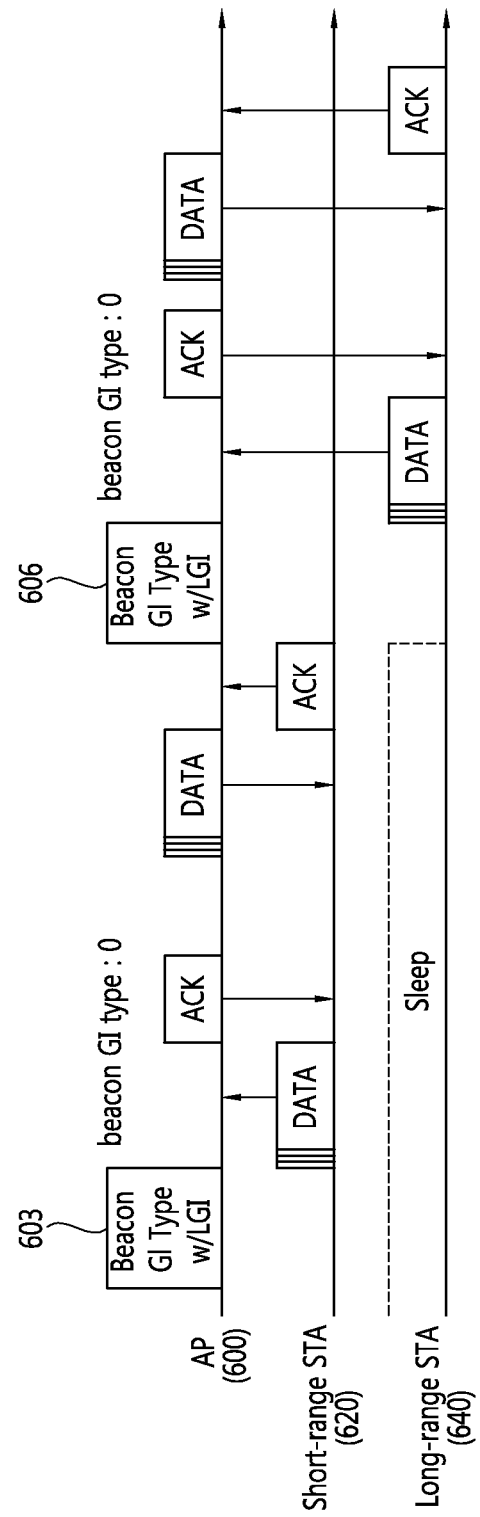
FIG. 6 illustrates a case where guard interval information according to an embodiment of the present invention is transmitted being included in a management frame.

FIG. 6 illustrates a case where guard interval information according to an embodiment of the present invention is transmitted being included in a management frame.

FIG. 6 illustrates the case where guard interval information meant to indicate transmission of a beacon frame by using a long guard interval is transmitted being included in the beacon frame. What is illustrated in FIG. 6 corresponds to the beacon GI type 0 of Table 2 described above.

With reference to FIG. 6, the AP 600, by using the LGI, can transmit the beacon frame 603, 606 including information indicating that the beacon GI type is 0. Based on the beacon frame transmitted 603, 606, a short range STA 620 and a long range STA 640 can know that the beacon frame 603, 606 transmitted from the AP 600 uses the LGI.

Therefore, both of the short range STA 620 and the long range STA 640 can be associated with the AP 600 by using the beacon frame 603, 606 transmitted with the LGI.

Figure 7:
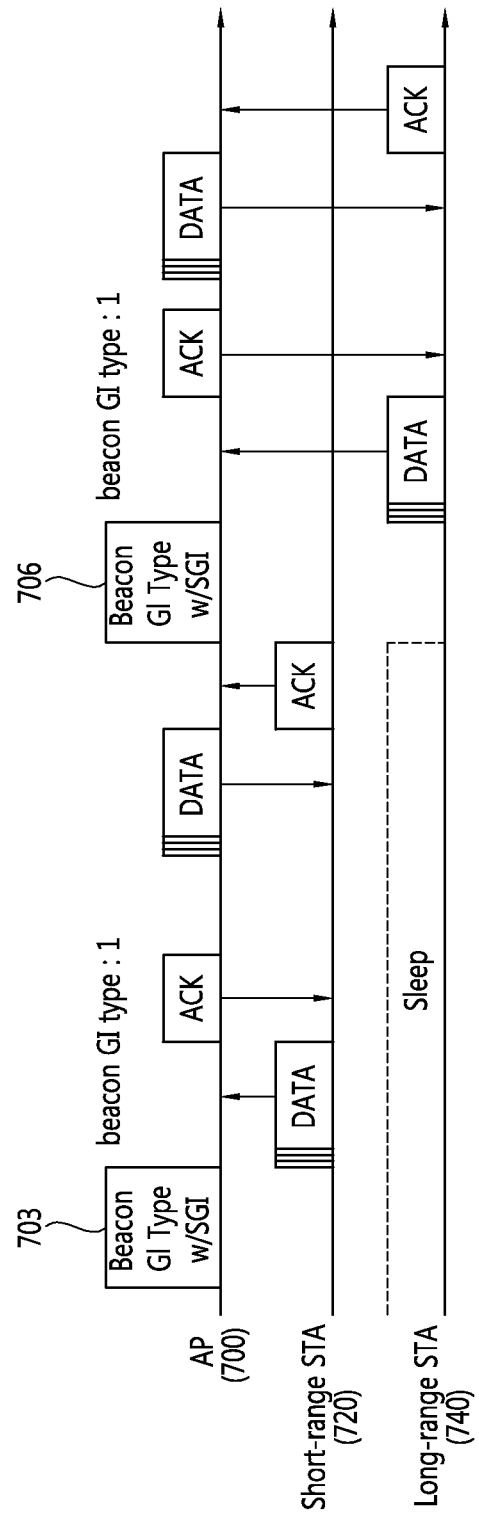
FIG. 7 illustrates a case where guard interval information according to an embodiment of the present invention is transmitted being included in a management frame.

FIG. 7 illustrates a case where guard interval information according to an embodiment of the present invention is transmitted being included in a management frame.

FIG. 7 illustrates the case where guard interval information meant to indicate transmission of a beacon frame by using a short guard interval is transmitted being included in the beacon frame 703, 706. What is illustrated in FIG. 7 corresponds to the beacon GI type 1 of Table 2 described above.

With reference to FIG. 7, the AP 700, by using the SGI, can transmit the beacon frame 703, 706 including information indicating that the beacon GI type is 1. Based on the beacon frame transmitted 703, 706, a short range STA 720 and a long range STA 740 can know that the beacon frame transmitted from the AP 700 uses the SGI.

Therefore, both of the short range STA 720 and the long range STA 740 can be associated with the AP 700 by using the beacon frame 703, 706 transmitted with the SGI. However, the long range STA 740 can wait to perform association with a different AP transmitting a beacon frame with the LGI rather than perform association with the AP 700 transmitting a beacon frame with the SGI.

Figure 8:
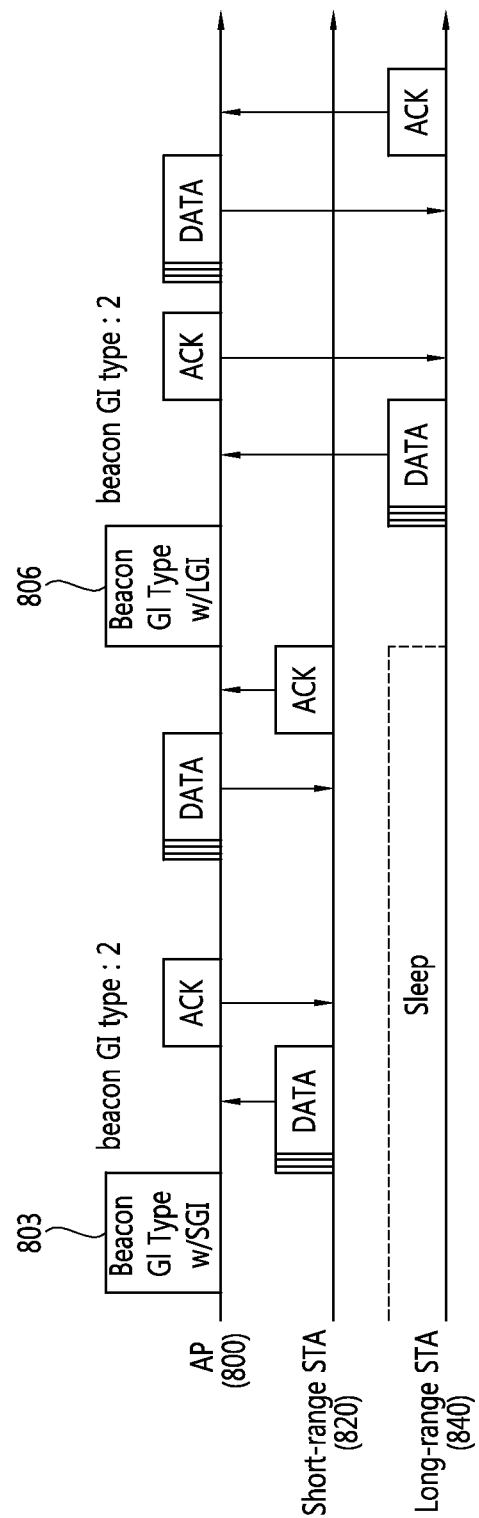
FIG. 8 illustrates a case where guard interval information according to an embodiment of the present invention is transmitted being included in a management frame.

FIG. 8 illustrates a case where guard interval information according to an embodiment of the present invention is transmitted being included in a management frame.

FIG. 8 illustrates the case where guard interval information meant to indicate transmission of a beacon frame by using an SGI and an LGI one after the other at regular intervals is transmitted being included in the beacon frame 803, 806. What is illustrated in FIG. 8 corresponds to the beacon GI type 2 of Table 2.

With reference to FIG. 8, the AP 800, by using the SGI, first transmits a beacon frame including information indicating that the beacon GI type is 2. Based on the beacon frame 803 transmitted with the SGI, a short range STA 820 is associated with the AP 800 and performs data transmission and reception to and from the AP 800.

In the next period, the AP 800, by using the LGI, transmits a beacon frame 806 including information indicating that the beacon GI type is 2. Based on the beacon frame 806 transmitted with the LGI, a long range STA 840 is associated with the AP 800 and performs data transmission and reception to and from the AP 800.

In the same way, a beacon frame is transmitted by using the SGI in the next period, and a beacon frame is then transmitted by using the LGI.

By using the method described above, the long range STA 840 does not receive SGI beaconing but awakes only at the time of LGI beaconing to receive a beacon frame transmitted with the LGI.

In other words, (1) when the beacon frame 803 with the SGI is transmitted from the AP 800, a short range STA 820, capable of decoding the SGI beaconing, awakes in accordance with the timing at which the beacon frame 803 with the SGI is transmitted and performs data transmission and reception to and from the AP 800.

(2) Next, when a beacon frame 806 with the LGI is transmitted, a long range STA 840, anticipating the beacon frame, awakes before the timing at which the beacon frame 840 with the LGI is transmitted, receives the beacon frame 840 with the LGI, and transmits a poll frame when confirming existence of data buffered to the long range STA itself.

As described above, an STA can know beforehand transmission timing of the SGI beaconing and the LGI beaconing. Therefore, each STA can achieve a power saving effect by selecting and receiving the guard interval type of a beacon frame that the STA wants to receive.

A method for determining a guard interval according to an embodiment of the present invention does not impose a constraint such that a long range STA 840 is allowed to perform communication only after LGI beaconing 806. In other words, regardless of whether it is a short range STA 820 or a long range STA 840, an STA awakes at the time of either SGI beaconing or LGI beaconing and performs data transmission and reception.

Figure 9:
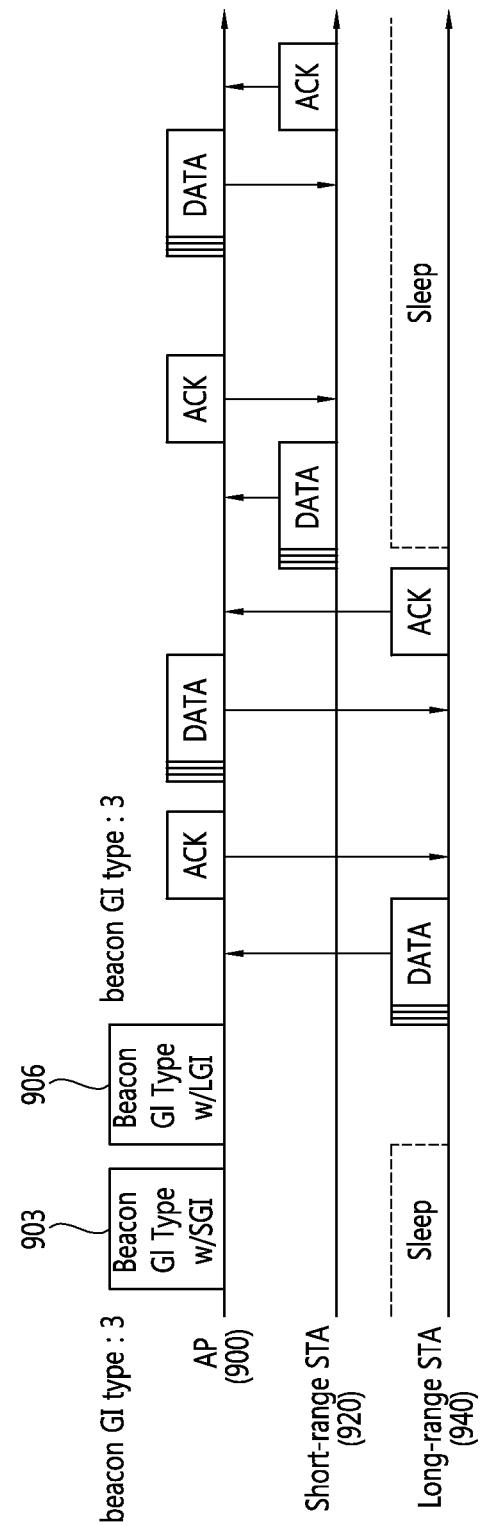
FIG. 9 illustrates a case where guard interval information according to an embodiment of the present invention is transmitted being included in a management frame.

FIG. 9 illustrates a case where guard interval information according to an embodiment of the present invention is transmitted being included in a management frame.

FIG. 9 illustrates the case where guard interval information meant to indicate continuous transmission of a beacon frame with an SGI or with an LGI is transmitted being included in the beacon frame 903, 906. What is illustrated in FIG. 9 corresponds to the beacon GI type 3 of Table 2.

With reference to FIG. 9, the AP 900, by using the SGI, first transmits a beacon frame including information indicating that the beacon GI type is 3. In case the beacon GI type is 3, a beacon frame 903 with the SGI is transmitted, and after a predetermined time period, a beacon frame 906 with the LGI is transmitted.

By using the method described above, (1) if a beacon frame 903 with the SGI is transmitted, a short range STA 920, anticipating the beacon frame, awakes before the timing at which the beacon frame 903 with the SGI is transmitted, receives the beacon frame 903 with the SGI, and transmits a poll frame to the AP 900 when confirming existence of data buffered to the short range STA itself.

(2) The short range STA 920, by using the bacon frame 906 with the LGI transmitted from the AP 900 after an SIFS or a PIFS interval since SGI beaconing, can perform scanning of the AP 900 and association therewith.

FIG. 9 assumes that LGI beaconing 906 is performed after SGI beaconing 903; however, the LGI beaconing 906 can be performed before the SGI beaconing regardless of a beaconing order.

The same as in FIG. 8, a method for determining a guard interval according to an embodiment of the present invention does not impose a constraint such that a long range STA 940 is allowed to perform communication only after LGI beaconing 906. In other words, regardless of whether it is a short range STA 920 or a long range STA 940, an STA awakes at the time of either SGI beaconing or LGI beaconing and performs data transmission and data reception.

FIGS. 6 to 9 described above assumed that a beacon GI type is transmitted being included in a beacon frame. As described above, however, the guard interval type and a method for transmitting a guard interval indicated by the corresponding guard interval type can be changed in an arbitrary manner. Also, information about the guard interval type can be transmitted being included in a different management frame, an embodiment of which also belongs to the technical scope of the present invention.

Figure 10:
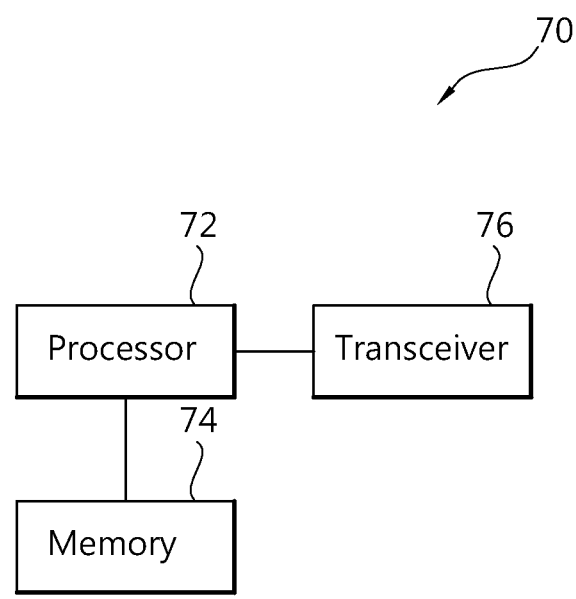
FIG. 10 is a block diagram of a wireless communication system to which an embodiment of the present invention can be applied.

FIG. 10 is a block diagram of a wireless communication system to which an embodiment of the present invention can be applied.

A wireless communication device 70 is a terminal in which the embodiments described above can be implemented and can be realized in the form of an AP or a non-AP STA. A station (STA) can refer to an AP or a non-AP STA.

The wireless communication device 70 comprises a processor 72, a memory 74, and a transceiver 76. The transceiver 76 transmits and receives a radio signal and implements the physical layer (PHY) of the IEEE 802.11 specifications. The processor 72, being functionally connected to the transceiver, implements the MAC layer and the PHY of the IEEE 802.11 specifications. The processor 72 can perform operation according to the embodiments described by FIGS. 4 to 9. For example, information related to a guard interval can be transmitted being included in a beacon frame.

Also, by receiving a beacon frame with guard interval information, which beacon frame with the corresponding guard interval to receive can be determined. In other words, the processor 72 can be implemented to realize the embodiments of the present invention described above.

The processor 72 and/or the transceiver 76 can include Application-Specific Integrated Circuit (ASIC), other chipsets, logical circuit, and/or a data processing module. The memory 74 can include Read-Only Memory (ROM), Random Access Memory (RAM), flash memory, memory card, storage medium, and/or other storage module. In case the embodiments are implemented by software, the techniques described above can be implemented in the form of a module (procedure, function, and the like) carrying out the functions described above. A module can be stored in the memory 74 and run by the processor 72. The memory 74 can be installed inside or outside the processor 74 and can be connected to the processor 74 through various well-known means.

What is claimed is:

1. A method for receiving a beacon frame, comprising:
receiving a first beacon frame including guard interval type information;
determining a second beacon frame to receive after the first beacon frame based on the guard interval type information; and
receiving the second beacon frame,
wherein the guard interval type information includes information on a guard interval used to transmit the second beacon frame, and
wherein the guard interval type information indicates that a Long Guard Interval (LGI) beacon frame with a long guard interval is transmitted during a first transmission period and a Short Guard Interval (SGI) beacon frame with a short guard interval is transmitted during a second transmission period.

2. The method of claim 1, wherein the guard interval type information corresponds to one of information indicating that all of the beacon frames transmitted are LGI beacon frames and information indicating that all of the beacon frames transmitted are SGI beacon frames.

3. The method of claim 1, wherein the determining a second beacon frame to be received after the first beacon frame based on the guard interval type information comprises:
determining a transmission period of the SGI beacon frame based on the guard interval type information; and
receiving the SGI beacon frame transmitted at the transmission period of the SGI beacon frame.

4. The method of claim 1, wherein determining a second beacon frame to be received after the first beacon frame based on the guard interval type information comprises
determining a transmission period of the LGI beacon frame based on the guard interval type information; and
receiving the LGI beacon frame transmitted at the transmission period of the LGI beacon frame.

5. The method of claim 1, wherein the guard interval type information indicates that the LGI beacon frame and the SGI beacon frame are transmitted consecutively in one period.

6. The method of claim 5, wherein determining a second beacon frame to be received after the first beacon frame based on the guard interval type information comprises:
determining a transmission period of the SGI beacon frame utilizing a short guard interval based on the guard interval type information; and
receiving the SGI beacon frame transmitted at the transmission period of the SGI beacon frame.

7. The method of claim 5, wherein determining a second beacon frame to be received after the first beacon frame based on the guard interval type information comprises
determining a transmission period of the LGI beacon frame utilizing a short guard interval based on the guard interval type information; and
receiving the LGI beacon frame transmitted at the LGI beacon frame transmission period.

8. A station receiving a beacon frame, comprising:
a radio frequency (RF) unit configured to transmit or receive a radio signal;
a processor operatively connected to the RF unit and configured to:
receive a first beacon frame including guard interval type information,
determine a second beacon frame to receive after the first beacon frame based on the guard interval type information, and
receive the second beacon frame,
wherein the guard interval type information includes information on a guard interval used to transmit the second beacon frame, and
wherein the guard interval type information indicates that a Long Guard Interval (LGI) beacon frame with a long guard interval is transmitted during a first transmission period and a Short Guard Interval (SGI) beacon frame with a short guard interval is transmitted during a second transmission period.

9. The station of claim 8, wherein the guard interval type information corresponds to one of information indicating that all of the beacon frames transmitted are LGI beacon frames and information indicating that all of the beacon frames transmitted are SGI beacon frames.

10. The station of claim 8, wherein the processor is further configured to determine a second beacon frame to be received after the first beacon frame based on the guard interval type information, to determine a transmission period of the SGI beacon frame based on the guard interval type information and to receive the SGI beacon frame transmitted at the transmission period of the SGI beacon frame.

11. The station of claim 8, wherein the processor is further configured to determine a second beacon frame to be received after the first beacon frame based on the guard interval type information, to determine a transmission period of the LGI beacon frame based on the guard interval type information and receive the LGI beacon frame transmitted at the transmission period of the LGI beacon frame.

12. The station of claim 8, wherein the guard interval type information indicates that the LGI beacon frame and the SGI beacon frame are transmitted consecutively in one period.

13. The station of claim 12, wherein the processor is further configured to determine a second beacon frame to be received after the first beacon frame based on the guard interval type information, to determine a transmission period of the SGI beacon frame utilizing a short guard interval based on the guard interval type information and to receive the SGI beacon frame transmitted at the SGI beacon frame transmission period.

14. The station of claim 12, wherein the processor is further configured to determine a second beacon frame to be received after the first beacon frame based on the guard interval type information, to determine a transmission period of the LGI beacon frame utilizing a short guard interval based on the guard interval type information and to receive the LGI beacon frame transmitted at the LGI beacon frame transmission period.

* * * * *